US006783915B2

(12) United States Patent
Pokorny et al.

(10) Patent No.: US 6,783,915 B2
(45) Date of Patent: Aug. 31, 2004

(54) THERMAL TRANSFER OF A BLACK MATRIX CONTAINING CARBON BLACK (75) Inventors: Richard J. Pokorny, Maplewood, MN (US); Raghunath Padiyath, Woodbury, MN (US); Kazuki Noda, Kanagawa Pref. (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/614,602

(22) Filed: Jul. 7, 2003

(65) Prior Publication Data

US 2004/0095457 A1 May 20, 2004

Related U.S. Application Data (62) Division of application No. 10/219,422, filed on Aug. 15, 2002, now Pat. No. 6,617,093, which is a division of application No. 09/312,421, filed on May 14, 1999, now Pat. No. 6,461,775.

(51) Int. Cl.[7] .............................................. G02F 1/1335
(52) U.S. Cl. ............................ 430/200; 430/7; 430/321
(58) Field of Search ............................ 430/7, 200, 201, 430/319, 321; 349/110

(56) References Cited

U.S. PATENT DOCUMENTS

| 4,252,671 A | 2/1981 | Smith |
| 4,722,583 A | 2/1988 | Stewart |
| 4,833,124 A | 5/1989 | Lum |
| 4,912,083 A | 3/1990 | Chapman et al. |
| 4,940,640 A | 7/1990 | MacDiarmid |
| 4,942,141 A | 7/1990 | DeBoer et al. |
| 4,948,776 A | 8/1990 | Evans et al. |
| 4,948,778 A | 8/1990 | DeBoer |
| 4,950,639 A | 8/1990 | DeBoer et al. |
| 4,952,552 A | 8/1990 | Chapman et al. |
| 5,023,229 A | 6/1991 | Evans et al. |
| 5,024,990 A | 6/1991 | Chapman et al. |
| 5,089,372 A | 2/1992 | Kirihata et al. |
| 5,121,237 A | 6/1992 | Ikeda et al. |
| 5,156,938 A | 10/1992 | Foley et al. |
| 5,166,024 A | 11/1992 | Bugner et al. |
| 5,171,650 A | 12/1992 | Ellis et al. |
| 5,256,506 A | 10/1993 | Ellis et al. |
| 5,286,604 A | 2/1994 | Simmons, III |
| 5,308,737 A | 5/1994 | Bills et al. |
| 5,318,938 A | 6/1994 | Hampl, Jr. et al. |
| 5,340,699 A | 8/1994 | Haley et al. |
| 5,351,617 A | 10/1994 | Williams et al. |
| 5,360,694 A | 11/1994 | Thien et al. |
| 5,401,607 A | 3/1995 | Takiff et al. |
| 5,437,912 A | 8/1995 | Chou et al. |
| 5,521,035 A | 5/1996 | Wolk et al. |
| 5,645,963 A | 7/1997 | Chang |
| 5,689,318 A | 11/1997 | Matsuyuma et al. |
| 5,695,907 A | 12/1997 | Chang |
| 5,710,097 A | 1/1998 | Staral et al. |
| 5,725,989 A | 3/1998 | Chang et al. |
| 5,766,827 A | 6/1998 | Bills et al. |
| 5,863,860 A | 1/1999 | Patel et al. |
| 6,001,530 A | 12/1999 | Kidnie et al. |
| 6,051,318 A | * 4/2000 | Kwon ........................ 428/413 |
| 6,146,792 A | * 11/2000 | Blanchet-Fincher et al. ... 430/7 |
| 6,221,543 B1 | 4/2001 | Guehler et al. |

FOREIGN PATENT DOCUMENTS

| EP | 0 321 923 | 6/1989 |
| EP | 0 365 222 | 4/1990 |
| EP | 0 400 737 | 5/1990 |
| EP | 0 529 362 | 3/1993 |
| EP | 0 568 993 | 11/1993 |
| EP | 0 615 860 B1 | 9/1994 |
| EP | 0 790 138 | 8/1997 |
| JP | H 4-324683 | 11/1992 |
| JP | H 9-101544 | 4/1997 |
| JP | H 10-253820 | 9/1998 |
| WO | WO 96/01718 | 1/1996 |
| WO | WO 97/15173 | 4/1997 |
| WO | WO 98/11471 | 3/1998 |

OTHER PUBLICATIONS

Bello, K.A. et al., *J. Chem. Soc. Chem. Commun.*, 1993, 452–454 (1993).

Kim et al., "Development of Organic Photoresist for Color Filter Balck Matrix," *Mat. Res. Soc. Symp. Proc. vol. 424*, Materials Research Society, 1997, pp. 329–334.

*Polymer Handbook*, J. Brandrup, ed., pp. VII 519–557 (1989).

* cited by examiner

*Primary Examiner*—John A. McPherson (57) ABSTRACT

A black matrix can be formed by thermal transfer on a receptor substrate for use, for example, in a display application. This black matrix can be used, for example, as a color filter black matrix or a TFT (thin film transistor) black matrix to provide contrast and/or to separate adjacent electrically-conducting components.

5 Claims, 3 Drawing Sheets

THERMAL TRANSFER OF A BLACK MATRIX CONTAINING CARBON BLACK

This application is a division of U.S. application Ser. No. 10/219,422, filed Aug. 15, 2002, U.S. Pat. No. 6,617,093, which is a division of U.S. application Ser. No. 09/312,421, filed May 14, 1999, now U.S. Pat. No. 6,461,775.

FIELD OF THE INVENTION

This invention relates to the thermal transfer of a black matrix onto a receptor and related thermal transfer donor sheets and products made therefrom. In particular, the invention relates to the thermal transfer of a black matrix onto a receptor using a thermal transfer donor sheet having a donor layer that includes carbon black.

BACKGROUND OF THE INVENTION

Black matrix coatings are used in many display applications to absorb ambient light and improve contrast. The black matrix is formed around individual pixels or light emitters of the display. In many liquid crystal displays (LCDs), the black matrix is a 0.1 to 0.2 $\mu$m coating of black chromium oxide on a display substrate. Black chromium oxide is typically sputtered onto the display substrate and is a relatively expensive process. In addition, the black chromium oxide typically forms a metallic surface with higher than desired reflectivity (and correspondingly reduced contrast). Furthermore, there are environmental and health concerns associated with chromium.

Resin black matrix (a pigment in a resin matrix) has been suggested as an alternative to black chromium oxide. The resin black matrix is coated onto the display substrate and then patterned using photolithography. To achieve a high optical density in a thin resin black matrix coating, it is typically necessary to use relatively high pigment loadings. This makes photolithography difficult because the patterning light (e.g., ultraviolet (UV) light) typically does not penetrate well into coatings with high optical densities. In addition, coatings with high levels of pigment have less resin. Because resin is the component of a coating that is etched, high optical density coatings (i.e., coatings with high pigment content) may not etch cleanly.

SUMMARY OF THE INVENTION

Generally, the present invention relates to the formation, by thermal transfer, of a black matrix on a receptor substrate for use, for example, in a display application. In particular, the present invention is directed to methods of making a color filter black matrix and/or a TFT (thin film transistor) black matrix, as well as the thermal transfer elements suitable for use in the methods, and the articles formed by the methods.

One embodiment is an optical display that includes a substrate, pixel elements disposed on the substrate, and a black matrix disposed between the pixel elements. Each of the pixel elements includes at least one electrically-conducting element to operate the pixel element. The black matrix has an optical density sufficient to provide optical contrast between the adjacent pixel elements, a resistivity that substantially prevents cross-talk between the electrically-conducting elements of adjacent pixel elements, and a thickness to maintain substantial planarity with at least a portion of adjacent electrically-conducting elements.

Another embodiment is a thermal transfer element for transferring a black matrix to a receptor to separate adjacent active devices. The thermal transfer element includes a substrate, a light-to-heat conversion layer, and a transfer layer. The transfer layer includes carbon black and is typically configured and arranged to provide, when transferred to a receptor, a black matrix having an average resistivity of at least $1\times10^{10}$ ohm-cm.

Yet another embodiment is a thermal transfer element for transferring a black matrix to a receptor to separate adjacent active devices. The thermal transfer element includes a substrate, a light-to-heat conversion layer, and a transfer layer. The transfer layer includes carbon black and is typically configured and arranged to provide, when transferred to a receptor, a black matrix having an optical density of at least 2.4.

A further embodiment is a method of forming a display device having pixel elements that each include an electrically-conducting element to operate the pixel element. A light-to-heat conversion layer is formed over a donor substrate. A black matrix transfer layer is formed over the light-to-heat conversion layer. The black matrix transfer layer is brought into contact with a substrate of the display device. The light-to-heat conversion layer is selectively irradiated, according to a pattern, with light having at least one wavelength that the light-to-heat conversion layer can convert to heat energy. A portion of the black matrix transfer layer is then thermally transferred, according to the pattern, to the substrate of the display device to form a black matrix defining a plurality of pixel elements. The black-matrix has an optical density sufficient to provide optical contrast between adjacent pixel elements, a resistivity that substantially prevents cross-talk between the electrically-conducting elements of adjacent pixel elements, and a thickness to maintain substantial planarity with at least a portion of adjacent electrically-conducting elements. An electrically-conducting element is formed for each pixel element on the substrate of the display device. The black matrix separates adjacent electrically-conducting elements.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to the formation of a black matrix on a receptor substrate for use, for example, in a display application. In particular, the present invention is directed to methods of forming a black matrix by thermal transfer using a thermal transfer element that may include a substrate, a light-to-heat conversion layer, and a black matrix transfer layer that includes carbon black; as well as, being directed to the thermal transfer elements useful for the methods and the articles formed thereby. While the present invention is not so limited, an appreciation of various aspects of the invention will be gained through a discussion of the examples provided below.

Figure 1:
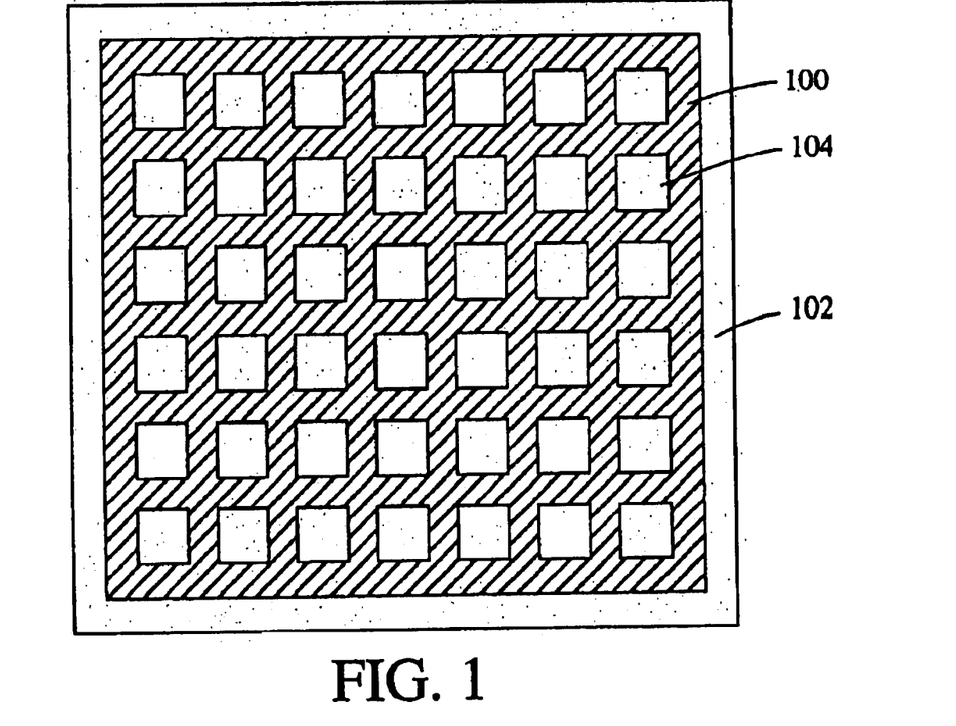
FIG. 1 is a schematic view of one embodiment of a black matrix formed on a receptor substrate, according to the invention.

FIG. 1 schematically illustrates a black matrix 100 formed on a receptor substrate 102 to provide windows 104 through which light from, for example, a backlighting source (not shown) can penetrate. The windows 104 correspond to individual pixels and/or components (e.g., liquid crystals, color filters, etc.). The black matrix 100 enhances contrast and absorbs ambient light.

Figure 2:
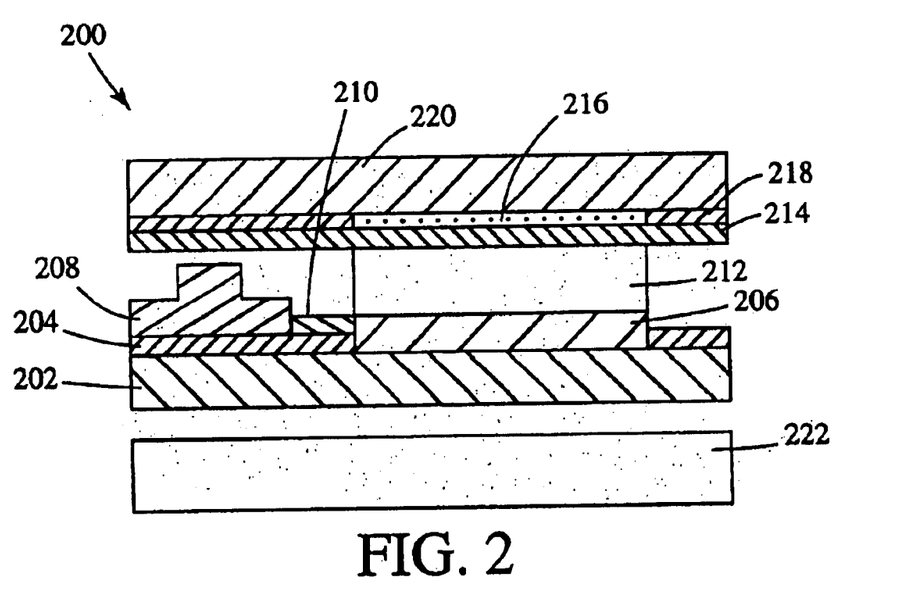
FIG. 2 is a schematic cross-section of one embodiment of a liquid crystal display (LCD) unit illustrating possible positions for a black matrix, according to the invention.

FIG. 2 schematically illustrates a cross-section of one example of a TFT (thin film transistor) display pixel 200. It will be understood that other types of displays may be used and the display pixel 200 may include other and/or alternative components. The display pixel includes a first substrate 202, TFT black matrix 204, display electrode 206, thin film transistor 208, conductor 210, liquid crystal 212, common electrode 214, color filter 216, color filter black matrix 218, and second substrate 220. The display pixel 200 is backlit by a light source 222. The display pixel may also include other components such as a capacitor and/or a polarizing film. In addition, the display pixel may include other alternative components, such as an organic electroluminescent lamp (OEL) instead of the liquid crystal, color filter, and/or light source. In some embodiments, both the TFT black matrix 204 and color filter black matrix 218 are used. In other embodiments, only one of the TFT black matrix 204 and color filter black matrix 218 is used. Examples of suitable display pixels and methods of forming display pixels are described in U.S. Pat. No. 6,221,543, filed concurrently herewith.

A black matrix layer, such as the TFT black matrix 204 and/or the color filter black matrix 218, can be formed by the transfer of a black matrix transfer layer from a thermal transfer element. The thermal transfer element can be heated by application of directed heat on a selected portion of the thermal transfer element. Heat can be generated using a heating element (e.g., a resistive heating element), converting radiation (e.g., a beam of light) to heat, and/or applying an electrical current to a layer of the thermal transfer element to generate heat. In many instances, thermal transfer using light from, for example, a lamp or laser, is advantageous because of the accuracy and precision that can often be achieved. The size and shape of the transferred pattern (e.g., a line, circle, square, or other shape) can be controlled by, for example, selecting the size of the light beam, the exposure pattern of the light beam, the duration of directed beam contact with the thermal transfer element, and/or the materials of the thermal transfer element.

Thermal transfer of a transfer layer to form a black matrix is useful, for example, it overcome the limitations of and to reduce or eliminate the wet processing steps of processes such as photolithographic patterning. In addition, thermal transfer using light can often provide better accuracy and quality control. Moreover, thermal transfer using light may, at least in some instances, provide for better registration when forming other layers, such as color filter layers, thin film transistor layers, or electrode layers by subsequent or previous thermal transfer steps or other methods of forming these layers.

Figure 3:
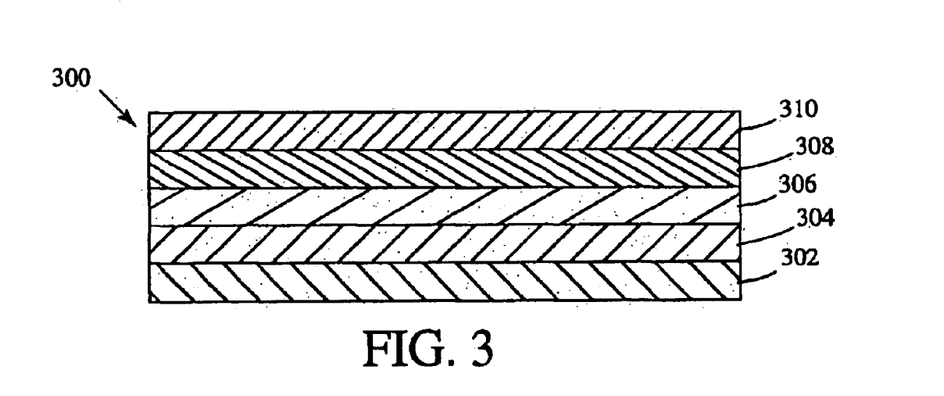
FIG. 3 is a schematic cross-section of one embodiment of a thermal transfer element for creating a black matrix on a receptor substrate, according to the invention.

One example of a suitable thermal transfer element 300 is illustrated in FIG. 3. The thermal transfer element 300 includes a donor substrate 302, an optional primer layer 304, a light-to-heat conversion (LTHC) layer 306, an optional interlayer 308, and a transfer layer 310. Directed light from a light-emitting source, such as a laser or lamp, can be used to illuminate the thermal transfer element 300 according to a pattern. The LTHC layer 306 contains a radiation absorber that converts light energy to heat energy. The conversion of the light energy to heat energy results in the transfer of a portion of the transfer layer 310 to a receptor substrate (not shown).

Figure 4:
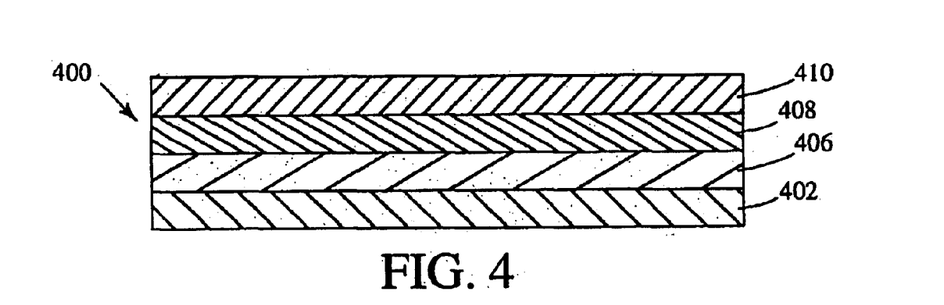
FIG. 4 is a schematic cross-section of a second embodiment of a thermal transfer element for creating a black matrix on a receptor substrate, according to the invention.
Figure 5:
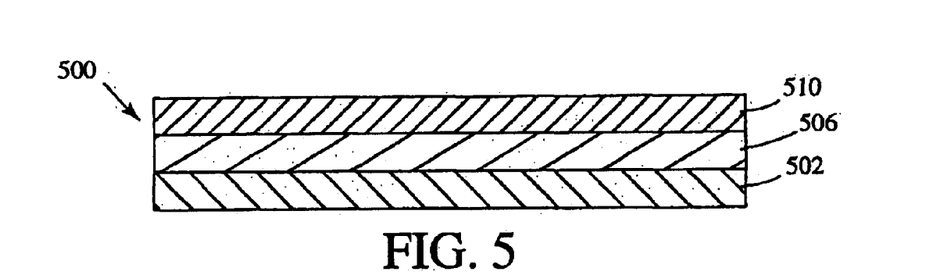
FIG. 5 is a schematic cross-section of a third embodiment of a thermal transfer element for creating a black matrix on a receptor substrate, according to the invention.
Figure 6:
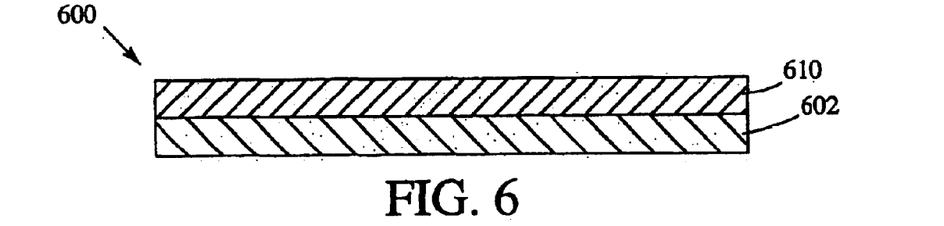
FIG. 6 is a schematic cross-section of a fourth embodiment of a thermal transfer element for creating a black matrix on a receptor substrate, according to the invention.

Another example of a thermal transfer element 400 includes a donor substrate 402, a LTHC layer 406, an interlayer 408, and a transfer layer 410, as illustrated in FIG. 4. Another suitable thermal transfer element 500 includes a donor substrate 502, a LTHC layer 506, and a transfer layer 510, as illustrated in FIG. 5. Yet another example of a thermal transfer element 600 includes a donor substrate 602 and a transfer layer 610, as illustrated in FIG. 6, with an optional radiation absorber disposed in the donor substrate 602 and/or transfer layer 610 to convert light energy to heat energy. Alternatively, the thermal transfer element 600 may be constructed without a radiation absorber. For thermal transfer of the transfer layer 610, a heating element, such as a resistive heating element, contacts the thermal transfer element to selectively heat the thermal transfer element and transfer the transfer layer according to a pattern. A thermal transfer element 600 without radiation absorber may optionally include a release layer, an interlayer, and/or other layers (e.g., a coating to prevent sticking of the resistive heating element).

Figure 7A:
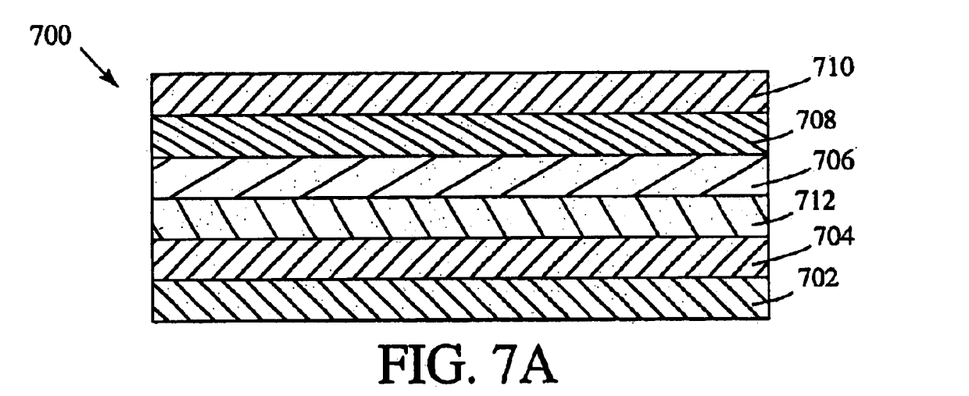
FIG. 7A is a schematic cross-section of a fifth embodiment of a thermal transfer element for creating a black matrix on a receptor substrate, according to the invention.
Figure 7B:
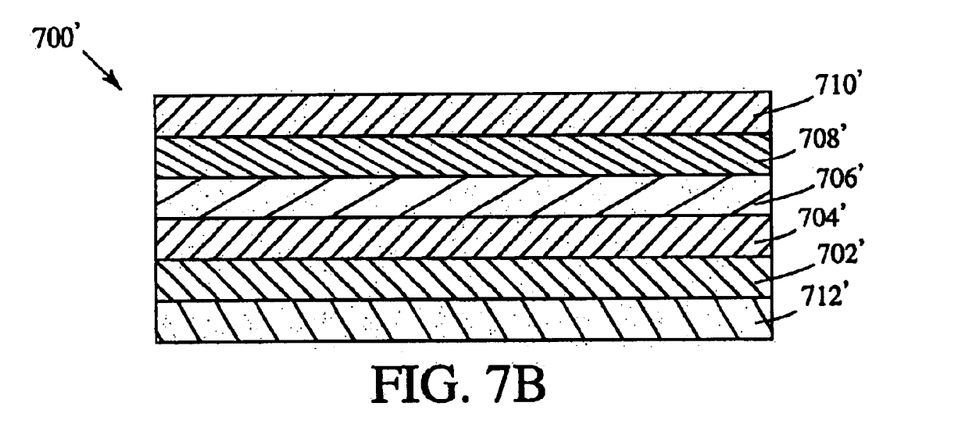
FIG. 7B is a schematic cross-section of a sixth embodiment of a thermal transfer element for creating a black matrix on a receptor substrate, according to the invention.

Yet another example of a thermal transfer element 700 includes a donor substrate 702, an optional primer layer 704, a color changing layer 712, a LTHC layer 706, an optional interlayer 708, and a thermal transfer layer 710, as illustrated in FIG. 7A. As an alternative, a thermal transfer element 700' includes a color changing layer 712', a donor substrate 702', an optional primer layer 704', a LTHC layer 706', an optional interlayer 708', and a thermal transfer layer as illustrated in FIG. 7B. The color changing layer 712 is configured so that an illuminated portion of the color changing layer 712 changes color to reduce or prevent heat damage to a transferred layer if the position is illuminated a second time. For example, rows and columns of a black matrix maybe formed individually. Intersection points between the rows and columns are illuminated twice. The color-changing layer, after being illuminated once or when heated as the LTHC absorbs light the first time, changes to a color that reflects or absorbs light to prevent or reduce heating of the LTHC layer during the second illumination. This may reduce or prevent damage (i.e., an increase in top or edge roughness) to the transferred portion of the transfer layer. It will be understood that a color changing layer may be used with any of the other thermal transfer elements described herein.

For thermal transfer using radiation (e.g., light), a variety of radiation-emitting sources can be used. For analog techniques (e.g., exposure through a mask), high-powered light sources (e.g., xenon flash lamps and lasers) are useful. For digital imaging techniques, infrared, visible, and ultraviolet lasers are particularly useful. Suitable lasers include, for example, high power ($\geq 100$ mW) single mode laser diodes, fiber-coupled laser diodes, and diode-pumped solid state lasers (e.g., Nd:YAG and Nd:YLF). Laser exposure dwell times can be in the range from, for example, about 0.1 to 5 microseconds and laser fluences can be in the range from, for example, about 0.01 to about 1 J/cm$^2$.

When high spot placement accuracy is required (e.g., for high information full color display applications) over large substrate areas, a laser is particularly useful as the radiation source. Laser sources are also compatible with both large rigid substrates such as 1 m×1 m×1.1 mm glass, and continuous or sheeted film substrates, such as 100 $\mu$m polyimide sheets.

Resistive thermal print heads or arrays may be used, for example, with simplified donor film constructions lacking a LTHC layer and radiation absorber. This may be particularly useful with smaller substrate sizes (e.g., less than approximately 30 cm in any dimension) or for larger patterns, such as those required for alphanumeric segmented displays.

Donor Substrate and Optional Primer Layer

The donor substrate can be a polymer film. One suitable type of polymer film is a polyester film, for example, polyethylene terephthalate or polyethylene naphthalate films. However, other films with sufficient optical properties (if light is used for heating and transfer), including high transmission of light at a particular wavelength, as well as sufficient mechanical and thermal stability, for the particular application, can be used. The donor substrate, in at least some instances, is flat so that uniform coatings can be formed. The donor substrate is also typically selected from materials that remain stable despite heating of the LTHC layer. The typical thickness of the donor substrate ranges from 0.025 to 0.15 mm, preferably 0.05 to 0.1 mm, although thicker or thinner donor substrates may be used.

Typically, the materials used to form the donor substrate and the LTHC layer are selected to improve adhesion between the LTHC layer and the donor substrate. An optional priming layer can be used to increase uniformity during the coating of subsequent layers and also increase the interlayer bonding strength between the LTHC layer and the donor substrate. One example of a suitable substrate with primer layer is available from Teijin Ltd. (Product No. HPE100, Osaka, Japan).

Light-to-Heat Conversion (LTHC) Layer

For radiation-induced thermal transfer, a light-to-heat conversion (LTHC) layer is typically incorporated within the thermal transfer element to couple the energy of light radiated from a light-emitting source into the thermal transfer element. The LTHC layer preferably includes a radiation absorber that absorbs incident radiation (e.g., laser light) and converts at least a portion of the incident radiation into heat to enable transfer of the transfer layer from the thermal transfer element to the receptor. In some embodiments, there is no separate LTHC layer and, instead, the radiation absorber is disposed in another layer of the thermal transfer element, such as the donor substrate or the transfer layer. In other embodiments, the thermal transfer element includes an LTHC layer and also includes additional radiation absorber (s) disposed in one or more of the other layers of the thermal transfer element, such as, for example, the donor substrate or the transfer layer. In yet other embodiments, the thermal transfer element does not include an LTHC layer or radiation absorber and the transfer layer is transferred using a heating element that contacts the thermal transfer element.

Typically, the radiation absorber in the LTHC layer (or other layers) absorbs light in the infrared, visible, and/or ultraviolet regions of the electromagnetic spectrum and converts the absorbed radiation into heat. The radiation absorber is typically highly absorptive of the selected imaging radiation, providing a LTHC layer with an optical density at the wavelength of the imaging radiation in the range of 0.2 to 3, or from 0.5 to 2.5, for white light. (For light having a wavelength of 1064 nm, the optical density is typically in the range of about 0.1 to about 2, or from about 0.3 to about 1.8) Optical density is the logarithm of the ratio of a) the intensity of light incident on the layer and b) the intensity of light transmitted through the layer. In at least some instances, because black matrix transfer layers have a relatively high optical density, the optical density of the LTHC layer ranges from 1.6 to 2.2 for white light (from about 1.1 to about 1.5 for light having a wavelength of 1064 nm.) Thicker coatings generally have higher optical densities, but may, at least in some instances, have less efficient heat transfer. Higher optical density LTHC layers may provide improved top roughness of the transferred layer, but may also result in increased edge roughness of the transferred layer.

Suitable radiation absorbing materials can include, for example, dyes (e.g., visible dyes, ultraviolet dyes, infrared dyes, fluorescent dyes, and radiation polarizing dyes), pigments, metals, metal compounds, metal films, and other suitable absorbing materials. Examples of suitable radiation absorbers includes carbon black, metal oxides, and metal sulfides. One example of a suitable LTHC layer can include a pigment, such as carbon black, and a binder, such as an organic polymer. The amount of carbon black may range, for example, from 5 to 15 wt. % or 7 to 11 wt. %. High carbon black loadings may improve sensitivity and edge roughness of the transferred layer, but may also increase top roughness. Low carbon loadings may prevent or reduce damage at points (e.g., cross-over points of a black matrix) that are illuminated twice.

Another suitable LTHC layer includes metal or metal/metal oxide formed as a thin film, for example, black aluminum (i.e., a partially oxidized aluminum having a black visual appearance). Metallic and metal compound films may be formed by techniques, such as, for example, sputtering and evaporative deposition. Particulate coatings may be formed using a binder and any suitable dry or wet coating techniques.

Dyes suitable for use as radiation absorbers in a LTHC layer may be present in particulate form, dissolved in a binder material, or at least partially dispersed in ad binder material. When dispersed particulate radiation absorbers are used, the particle size can be, at least in some instances, about 10 $\mu$m or less, and may be about 1 $\mu$m or less. Suitable dyes include those dyes that absorb in the IR region of the spectrum. Examples of such dyes may be found in Matsuoka, M., "Infrared Absorbing Materials", Plenum Press, New York, 1990; Matsuoka, M., *Absorption Spectra of Dyes for Diode Lasers*, Bunshin Publishing Co., Tokyo, 1990, U.S. Pat. Nos. 4,722,583; 4,833,124; 4,912,083; 4,942,141; 4,948,776; 4,948,778; 4,950,639; 4,940,640; 4,952,552; 5,023,229; 5,024,990; 5,156,938; 5,286,604; 5,340,699; 5,351,617; 5,360,694; and 5,401,607; European Patent Nos. 321,923 and 568,993; and Beilo, K. A. et al., *J. Chem. Soc. Chem. Commun.*, 1993, 452–454 (1993), all of which are herein incorporated by reference. IR absorbers marketed by Glendale Protective Technologies, Inc., Lakeland, Fla., under the designation CYASORB IR-99, IR-126 and IR-165 may also be used. A specific dye may be chosen based on factors such as, solubility in, and compatibility with, a specific binder and/or, coating solvent, as well as the wavelength range of absorption.

Pigmentary materials may also be used in the LTHC layer as radiation absorbers. Examples of suitable pigments include carbon black and graphite, as well as phthalocyanines, nickel dithiolenes, and other pigments described in U.S. Pat. Nos. 5,166,024 and 5,351,617, incorporated herein by reference. Additionally, black azo pigments based on copper or chromium complexes of, for example, pyrazolone yellow, dianisidine red, and nickel azo yellow can be useful. Inorganic pigments can also be used, including, for example, oxides and sulfides of metals such as aluminum, bismuth, tin, indium, zinc, titanium, chromium, molybdenum, tungsten, cobalt, iridium, nickel, palladium, platinum, copper, silver, gold, zirconium, iron, lead, and tellurium. Metal borides, carbides, nitrides, carbonitrides, bronze-structured oxides, and oxides structurally related to the bronze family (e.g., $WO_{2.9}$) may also be used.

Metal radiation absorbers may be used, either in the form of particles, as described for instance in U.S. Pat. No. 4,252,671, incorporated herein by reference, or as films, as disclosed in U.S. Pat. No. 5,256,506, incorporated herein by reference. Suitable metals include, for example, aluminum, bismuth, tin, indium, tellurium and zinc.

As indicated, a particulate radiation absorber may be disposed in a binder. The weight percent of the radiation absorber in the coating, excluding the solvent in the calculation of weight percent, is generally from 1 wt. % to 30 wt. %, preferably., from 3 wt. % to 20wt. %, and most preferably from .5 wt. % to 15%, depending, at least in part, on the particular radiation absorber(s) and binder(s) used in the LTHC.

Suitable binders for use in the LTHC layer include film-forming polymers, such as, for example, phenolic resins (e.g., novolak and resole resins), polyvinyl butyral resins, polyvinyl acetates, polyvinyl acetals, polyvinylidene chlorides, polyacrylates, cellulosic ethers and esters, nitrocelluloses, and polycarbonates. Suitable binders may include monomers, oligomers, or polymers that have been or can be polymerized or crosslinked. In some embodiments, the binder is primarily formed using a coating of crosslinkable monomers and/or oligomers with optional polymer. When a polymer is used in the binder, the binder includes 1 to 50 wt. %, preferably, 10 to 45 wt. %, polymer (excluding the solvent when calculating wt. %).

Upon coating on the donor substrate, the, monomers, oligomers, and polymers are crosslinked to form the LTHC. In some instances, if crosslinking of the LTHC layer is too low, the LTHC layer may be damaged by the heat and/or permit the transfer of a portion of the LTHC layer to the receptor with the transfer layer.

The inclusion of a thermoplastic resin (e.g., polymer) may improve, in at least some instances, the performance (e.g., transfer properties and/or coatability) of the LTHC layer. It is thought that a thermoplastic resin may improve the adhesion of the LTHC layer to the donor substrate. In one embodiment, the binder includes 25 to 50 wt. % (excluding the solvent when calculating weight percent) thermoplastic resin, and, preferably, 30 to 45 wt. % thermoplastic resin, although lower amounts of thermoplastic resin may be used (e.g., 1 to 15 wt. %). The thermoplastic resin is typically chosen to be compatible (i.e., form a one-phase combination) with the other materials of the binder. A solubility parameter can be used to indicate compatibility, *Polymer Handbook*, J. Brandrup, ed., pp. VII 519–557 (1989), incorporated herein by reference. In at least some embodiments, a thermoplastic resin that has a solubility parameter in the range of 9 to 13 $(cal/cm^3)^{1/2}$, preferably, 9.5 to 12 $(cal/cm^3)^{1/2}$, is chosen for the binder. Examples of suitable thermoplastic resins include polyacrylics, styrene-acrylic polymers and resins, and polyvinyl butyral.

Conventional coating aids, such as surfactants and dispersing agents, may be added to facilitate the coating process. The LTHC layer may be coated onto the donor substrate using a variety of coating methods known in the art. A polymeric or organic LTHC layer is coated, in at least some instances, to a thickness of 0.05 $\mu$m to 20 $\mu$m, preferably, 0.5 $\mu$m to 10 $\mu$m, and, more preferably, 1 $\mu$m to 7 $\mu$m. An inorganic LTHC layer is coated, in at least some instances, to a thickness in the range of 0.001 to 10 $\mu$m, and preferably, 0.002 to 1 $\mu$m.

Interlayer

An optional interlayer may be used to minimize damage and contamination of the transferred portion of the transfer layer and may also reduce distortion in the transferred portion of the transfer layer. The interlayer may also influence the adhesion of the transfer layer to the rest of the thermal transfer element. Typically, the interlayer has high thermal resistance. Preferably, the interlayer does not distort or chemically decompose under the imaging conditions, particularly to an extent that renders the transferred image non-functional. The interlayer typically remains in contact with the LTHC layer during the transfer process and is not substantially transferred with the transfer layer.

Suitable interlayers include, for example, polymer films, metal layers (e.g., vapor deposited metal layers), inorganic layers (e.g., sol-gel deposited layers and vapor deposited layers of inorganic oxides (e.g., silica, titania and other metal oxides)), and organic/inorganic composite layers. Organic materials suitable as interlayer materials include both thermoset and thermoplastic materials. Suitable thermoset materials include resins that may be crosslinked by heat, radiation, or chemical treatment including, but not limited to, crosslinked or crosslinkable polyacrylates, polymethacrylates, polyesters, epoxies, and polyurethanes. The thermoset materials may be coated onto the LTHC layer as, for example, thermoplastic precursors and subsequently crosslinked to form a crosslinked interlayer.

Suitable thermoplastic materials include, for example, polyacrylates, polymethacrylates, polystyrenes, polyurethanes, polysulfones, polyesters, and polyimides. These thermoplastic organic materials may be applied via conventional coating techniques (for example, solvent coating spray coating, or extrusion coating). Typically, the glass transition temperature ($T_g$) of thermoplastic materials suitable for use in the interlayer is 25° C. or greater, preferably 50° C. or greater, more preferably 100° C. or greater, and, most preferably, 150° C. or greater. In some embodiments, the interlayer includes a thermoplastic material that has a $T_g$ greater than any temperature attained in the transfer layer during imaging. The interlayer may be either transmissive, absorbing, reflective, or some combination thereof, at the imaging radiation wavelength.

Inorganic materials suitable as interlayer materials include, for example, metals, metal oxides, metal sulfides, and inorganic carbon coatings, including those materials that are highly transmissive or reflective at the imaging light wavelength. These materials may be applied to the light-to-heat-conversion layer via conventional techniques (e.g., vacuum sputtering, vacuum evaporation, or plasma jet, deposition).

The interlayer may provide a number of benefits. The interlayer may be a barrier against the transfer of material from the light-to-heat conversion layer. It may also modulate the temperature attained in the transfer layer so that thermally unstable materials can be transferred. For example, the interlayer can act as a thermal diffuser to control the temperature at the interface between the interlayer and the transfer layer relative to the temperature attained in the LTHC layer. This may improve the quality (i.e., surface roughness, edge roughness, etc.) of the transferred layer. The presence of an interlayer may also result in improved plastic memory in the transferred material.

The interlayer may contain additives, including, for example, photoinitiators, surfactants, pigments, plasticizers, and coating aids. The thickness of the interlayer may depend on factors such as, for example, the material of the interlayer, the material of the LTHC layer, the material of the transfer layer, the wavelength of the imaging radiation, and the duration of exposure of the thermal transfer element to imaging radiation. For polymer interlayers, the thickness of the interlayer typically is in the range of 0.05 $\mu$m to 10 $\mu$m, preferably, from about 0.1 $\mu$m to 4 $\mu$m, more preferably, 0.5 to 3 $\Xi$m, and, most preferably, 0.8 to 2 $\mu$m. For inorganic interlayers (e.g., metal or metal compound interlayers), the thickness of the interlayer typically is in the range of 0.005 $\mu$m to 10 $\mu$m, preferably, from about 0.01 $\mu$m to 3 $\mu$m, and, more preferably, from about 0.02 to 1 $\mu$m.

Color-Changing Layer

The thermal transfer element may optionally include a color-changing layer to reduce or prevent damage to a transferred portion of the transfer layer if the same portion of the thermal transfer element is illuminated or heated two or more times. This may occur, for example, when both row lines and column lines of a black matrix are, separately transferred without changing the thermal transfer element. The positions where the rows and column intersect (i.e., the cross-over points) are illuminated or heated at least twice. The color-changing layer includes a material that changes color upon exposure to light of the illuminating wavelength or upon exposure to heat. Preferably, this material does not change color significantly prior to the first exposure to light and/or heat.

In at least some embodiments, the color-changing layer is substantially transparent to at least the wavelength of light used to heat the LTHC layer. When exposed to the illuminating light or to the heat generated by the LTHC layer, the color-changing layer changes color to reflect and/or absorb at least a portion, and preferably all, of the light used to illuminate the LTHC layer. Thus, upon illumination a second time, the LTHC will not heat or will be heated to a smaller degree and, therefore, reduce or prevent damage to the already transferred portion of the transfer layer.

The color-changing layer can be disposed, for example, between the donor substrate and the light-to-heat conversion layer or on a side of the donor substrate opposite the side upon which the light-to-heat conversion layer is disposed. Suitable coatings include, for example, leuco dyes which can be applied to the donor substrate. The leuco dye may be colorless when applied, but turn black when exposed to heat. One suitable example is a combination of Pergascript Black I-R and HRJ 11842 Zinc-Modified Resin both available from (Schenectady International, Schenectady, N.Y.).

Black Matrix Thermal Transfer Layer

The black matrix thermal transfer layer is typically made using materials that are capable of forming a thin, high optical density coating on a receptor substrate when transferred. In at least some instances, particularly, if the black matrix coating will separate electrically-conducting elements on the receptor substrate, the black matrix thermal transfer layer is formed using a material that, when transferred, has a relatively high resistivity to prevent cross-talk between adjacent electrically-conducting elements.

The black matrix thermal transfer layer typically includes a pigment or dye in a binder. A suitable pigment is carbon black. Although carbon black is a conductor, it has been found, surprisingly, that thin, high optical density black matrix coatings having a thickness between 0.5 and 1.5 $\mu$m can be formed having a resistivity of $1 \times 10^8$ ohm-cm or $1 \times 10^{10}$ ohm-cm or $1 \times 10^{13}$ ohm-cm or greater. For some applications, such as a TFT black matrix, the resistivity of the black matrix must be about $1 \times 10^{10}$ ohm-cm or even $1 \times 10^{13}$ ohm-cm to separate adjacent electrically-conducting devices, such as, for example, thin film transistors and conductive lines connecting the transistors to a controller. For other applications such as a color filter black matrix $1 \times 10^9$ ohm-cm or $1 \times 10^8$ ohm-cm or, in some instances, $1 \times 10^6$ ohm-cm may be sufficient.

The thickness of the black matrix thermal transfer layer may be chosen to provide a relatively planar surface with other components of the device (e.g., a display device). For example, a TFT black matrix may have a thickness so that the black matrix is relatively planar with at least a portion of the thin film transistor (TFT). A color filter black matrix may have a thickness chosen so that the black matrix is relatively planar with the color filter. Examples of suitable ranges of thickness include 0.5 to 1.5 $\mu$m or 0.7 to 1.1 $\mu$m. However, thicker and thinner black matrices can be formed, although thinner black matrices typically have a lower optical density for the same carbon black loading.

One suitable black matrix transfer layer includes (excluding solvent) 40 to 55 wt. %, preferably 45 to 50 wt. %, carbon black, 2 to 10 wt. %, preferably 3 to 8 wt. %, dispersant, and 35 to 58 wt. % binder. The binder can be, for example, any of a variety of polymeric compositions including one or more film-forming polymers, such as, for example, phenolic resins (e.g., novolak and resole resins), polyvinyl butyral resins, polyvinyl acetates, polyvinyl acetals, polyvinylidene chlorides, polyacrylates, cellulosic ethers and esters, nitrocelluloses, epoxy resins, and polycarbonates. Suitable binders may include monomers, oligomers, or polymers that have been or can be polymerized or crosslinked.

The dispersant helps the carbon black to disperse throughout the binder. Good dispersion provides for uniform properties and can reduce or prevent the formation of regions with lower than expected resistivity In addition, better dispersion generally results in higher optical density for a given carbon black loading. Examples of suitable dispersants include Disperbyk 182, Disperbyk 163, Disperbyk 160, Disperbyk 164 (Byk-Chemie, Wallingford, Conn.) and the like. The black matrix transfer layer may include, for example, 2 to 10 wt. % or 3 to 8 wt. % dispersant. The particular dispersant may be determined by the type of carbon black that is used. The carbon black and dispersant can be mixed using a suitable solvent and dispersing equipment, such as, for example, a ball mill or Eiger mill. Other conventional coating aids, such as surfactants, may be added to facilitate the coating process.

A variety of different types of carbon black can be used. Carbon black can be obtained in a variety of sizes ranging from, for example, 8 nm to 200 nm or more.

In addition carbon black particles aggregate. While carbon black particles of any size can be used, preferred carbon black has an average particle size ranging from about 20 to 35 m and, more preferred, from about 22 to 30 nm. In addition, the preferred carbon black typically has more than 2 wt. % volatiles and, preferably, between 2 to 6 wt. %, as measured by DIN 53552. Furthermore, the preferred carbon black has a dibutyl phthalate (DPB) absorption of about 45 to 70 mL of DPB per 100 grams of carbon black, as measured by DIN 53601, although values as high as 120 mL or higher may also be acceptable. Examples of carbon blacks with these properties include Special Black 550, 350, 4, and 4A (Degussa Corp., Dublin, Ohio) and Mogul L (Cabot Corp., Tuscola, Ill.).

The optical density of the black matrix transfer layer is typically relatively high so that the black matrix can absorb at least a portion of the ambient light and provide sufficient contrast that can be discerned by the human eye. Optical density depends on a variety of factors including, for example, the loading of pigment or dye (e.g., carbon black), the other components of th black matrix transfer layer, and the thickness of the layer. Typically, the optical density of the black matrix transfer layer is selected to be at least 2.4 for white light and, in some embodiments, may be at least 3.0, or at least 3.2, for white light.

Receptor

The receptor substrate may be any item suitable for a particular application including, but not limited to, glass, transparent films, metals, semiconductors, various papers, and plastics. The receptor substrate is typically any type of substrate suitable for display applications. Receptor substrates suitable for use in liquid crystal displays include rigid or flexible substrates that are substantially transmissive to visible light. Non-birefringent substrates are particularly suited. Examples of rigid substrates include glass, indium tin oxide coated glass, low temperature polysilicon (LTPS), and rigid plastic. Suitable flexible substrates include substantially clear and transmissive polymer films. Suitable polymer substrates include polyester base (e.g., polyethylene terephthalate, polyethylene naphthalate), polycarbonate resins, polyolefin resins, polyvinyl,resins (e.g., polyvinyl chloride, polyvinylidene chloride, polyvinyl acetals, etc.), cellulose ester bases (e.g., cellulose triacetate, cellulose acetate), and other conventional polymeric films used as supports in various imaging arts. Transparent polymeric film base of 2 to 100 mils (i.e. 0.05 to 2.54 mm) is preferred.

For glass substrates, a typical thickness is 0.2 to 2.0 mm. It is often desirable to use glass substrates that are 1.0 mm thick or less, or even 0.7 mm thick or less. Thinner substrates result in thinner and lighter weight displays. Certain processing, handling, and assembling conditions, however, may suggest that thicker substrates be used. For example, some assembly conditions may require compression of the display assembly to fix the positions of spacers disposed between the substrates. The competing concerns of thin substrates for lighter displays and thick substrates for reliable handling and processing can be balanced to achieve a preferred construction for particular display dimensions.

If the substrate is a polymeric film, it is preferred that the film be non-birefringent to substantially prevent interference with the operation of the display in which it is to be integrated. Exemplary non-birefringent substrates are polyesters that are solvent cast. Typical examples of these are those derived from polymers consisting or consisting essentially of repeating, interpolymerized units derived from 9,9-bis-(4-hydroxyphenyl)-fluorene and isophthalic acid, terephthalic acid or mixtures thereof, the polymer being sufficiently low in oligomer (i.e., chemical species having molecular weights of about 8000 or less) content to allow formation of a uniform film. This polymer has been disclosed as one component in a thermal transfer receiving element in U.S. Pat. No. 5,318,938. Another class of non-birefringent substrates are amorphous polyolefins (e.g., those sold under the trade designation Zeonex™ from Nippon Zeon Co., Ltd.).

Operation

During imaging, the thermal transfer element is typically brought into intimate contact with a receptor. In at least some instances, pressure or vacuum are used to hold the thermal transfer element in intimate contact with the receptor. A radiation source is then used to heat the LTHC layer (and/or other layer(s) containing radiation absorber) in an imagewise fashion (e.g., digitally or by analog exposure through a mask) to perform imagewise transfer of the transfer layer from the thermal transfer element to the receptor according to a pattern.

Typically, when an LTHC layer is used, the light is directed through the donor substrate to heat the LTHC layer. However, in some instances, a LTHC layer is not used and the light is directed through the receptor substrate to heat the black matrix; transfer layer, which contains carbon black and/or another radiation absorber. This may result in improved top and/or side roughness. In addition, the thermal transfer element requires fewer layers, because a separate LTHC layer is not used. Moreover, the amount of light energy (i.e., heat) needed for the transfer may be less than for thermal transfer elements with a LTHC.

Alternatively, a heating element, such as a resistive heating element, may be used to transfer the multicomponent transfer unit. The thermal transfer element is selectively contacted with the heating element to cause thermal transfer of a portion of the transfer layer according to a pattern. In another embodiment, the thermal transfer element may include a layer that can convert an electrical current applied to the layer into heat.

Typically, the transfer layer is transferred to the receptor without transferring any of the other layers f the thermal transfer element, such as the optional interlayer and the LTHC layer. The presence of the optional interlayer may eliminate or reduce the transfer of the LTHC layer to the receptor and/or reduce distortion in the, transferred portion of the transfer layer. Preferably, under imaging conditions, the adhesion of the interlayer to the LTHC layer is greater than the adhesion of the interlayer to the transfer layer. In some instances, a reflective interlayer can be used to attenuate the level of imaging radiation transmitted through the interlayer and reduce any damage to the transferred portion of the transfer layer that may result from interaction of the transmitted radiation with the transfer layer and/or the receptor. This is particularly beneficial in reducing thermal damage which may occur when the receptor is highly absorptive of the imaging radiation.

During laser exposure, it may be desirable to minimize formation of interference patterns due to multiple reflections from the imaged material. This can be accomplished by various methods. The most common method is to effectively roughen the surface of the thermal transfer element on the scale of the incident radiation as described in U.S. Pat. No. 5,089,372. This has the effect of disrupting the spatial coherence of the incident radiation, thus minimizing self interference. An alternate method is to employ an antireflection coating within the thermal transfer element. The use of anti-reflection coatings is known, and may consist of quarter-wave thicknesses of a coating such as magnesium fluoride, as described in U.S. Pat. No. 5,171,650, incorporated herein by reference.

Large thermal transfer elements can be used, including thermal transfer elements that have length and width dimensions of a meter or more. In operation, a laser can be rastered or otherwise moved across the large thermal transfer element, the laser being selectively operated to illuminate portions of the thermal transfer element according to a desired patter. Alternatively, the laser may be stationary and the thermal transfer element and/or receptor substrate moved beneath the laser.

In some instances, it may be necessary, desirable, and/or convenient to sequentially use two or more different thermal transfer elements to form a device, such as an optical display. For example, a black matrix may be formed, followed by the thermal transfer of a color filter in the windows of the black matrix. As another example, a black matrix may be formed, followed by the thermal transfer of one or more layers of a thin film transistor. A variety of other combinations of two or more thermal transfer elements can be used to form a device, each thermal transfer element forming one or more portions of the device. It will be understood that the black matrix may be thermally transferred before and/or after other components of the device are disposed on the substrate. It will also be understood that some, all, or none of these other components may be formed by thermal transfer.

EXAMPLES

Unless otherwise indicated, chemicals were obtained from Aldrich Chemical Company (Milwaukee, Wis.). The laser transfer system included a CW Nd:YAG laser, acousto-optic modulator, collimating and beam expanding optics, an optical isolator, a linear galvonometer and an f-theta scan lens. The Nd:YAG laser was operating in the TEM 00 mode, and produced a total power of 7.5 Watts. Scanning was accomplished with a high precision linear galvanometer (Cambridge Technology Inc., Cambridge, Mass.). The laser was focused to a Gaussian spot with a measured diameter of 140 μm at the $1/e^2$ intensity level. The spot was held constant across the scan width by utilizing an f-theta scan lens. The laser spot was scanned across the image surface at a velocity of 5.6 meters/second. The f-theta scan lens held the scan velocity uniform to within 0.1%, and the spot size constant to within±3 microns.

Example 1

Preparation of a Substrate/LTHC/Interlayer Element

A carbon black light-to-heat conversion layer was prepared by forming an LTHC Coating, according to Table 1, dissolved in a solvent that includes 70 wt. % propylene glycol methyl ether acetate and 30 wt. % methyl ethyl ketone. This solution was coated onto a 0.1 mm PET substrate with a Yasui Seiki Lab Coater, Model CAG-150 (Yasui Seiki Co., Bloomington, Ind.) using a microgravure roll of 381 helical cells per lineal cm (150 helical cells per lineal inch).

TABLE 1

LTHC Coating

| Component | Wt. % |
|---|---|
| Raven ™ 760 Ultra carbon black pigment (available from Columbian Chemicals, Atlanta, GA) | 8.0 |
| Butvar ™ B-98 (polyvinylbutyral resin, available from Monsanto, St. Louis, MO) | 1.4 |
| Joncryl ™ 67 (acrylic resin, available from S. C. Johnson & Son, Racine, WI) | 4.2 |
| Elvacite ™ 2669 (acrylic resin, available from ICI Acrylics, Wilmington, DE) | 31.8 |
| Disperbyk ™ 161 (dispersing aid, available from Byk Chemie, Wallingford, CT) | 0.7 |
| FC-430 ™ (fluorochemical surfactant, available from 3M, St. Paul, MN) | 0.03 |
| Ebecryl ™ 629 (epoxy novolac acrylate, available from UCB Radcure, N. Augusta, SC) | 47.6 |
| Irgacure ™ 369 (photocuring agent, available from Ciba Specialty Chemicals, Tarrytown, NY) | 5.3 |
| Irgacure ™ 184 (photocuring agent, available from Ciba Specialty Chemicals, Tarrytown, NY) | 0.8 |

The coating was in-line dried at 40° C. and UV-cured at 6.1 m/min using a Fusion Systems Model 1600 (400 W/in) UV curing system fitted with H-bulbs. The dried coating had a thickness of approximately 3 μm. The resulting LTHC layer had an optical density of about 1.8.

Onto the carbon black coating of the light-to-heat conversion layer was rotogravure coated an Interlayer Coating Solution, according to Table 2, using the Yasui Seiki Lab Coater, Model CAG-150 (Yasui Seiki Co., Bloomington, Ind.). This coating was in-line dried (40° C.) and UV-cured at 6.1 m/min using a Fusion Systems Model I600 (600 W/in) fitted with H-bulbs. The thickness of the resulting interlayer coating was approximately 1.7 microns.

TABLE 2

Interlayer Coating Solution

| Component | Parts by Weight |
|---|---|
| Butvar ™ B-98 | 0.98 |
| Joncryl ™ 67 | 2.95 |
| Sartomer ™ SR351 ™ (trimethylolpropane triacrylate, available from Sartomer, Exton, PA) | 15.75 |
| Irgacure ™ 369 | 1.38 |
| Irgacure ™ 184 | 0.2 |
| 1-methoxy-2-propanol | 31.5 |
| Methyl ethyl ketone | 47.24 |

Example 2

Formation of Black Matrix Thermal Transfer Element

A black matrix thermal transfer coating was made by combining, in a solvent of 28 wt. % propylene glycol methyl ether acetate and 82 wt. % methyl ethyl ketone, solids including 30 wt. % GCryl 6005 (acrylic resin from Henkel Corp., Cincinnati, Ohio), 18.8 wt. % Epon SU-8 (epoxy resin from Shell Chemical Co., Houston, Tex.), 45 wt. % Mogul L (carbon black from Cabot Corp., Tuscola, Ill.), and 6.2 wt. % Disperbyk 182 (Byk Chemie, Wallingford, Conn.). The carbon black, Disperbyk™, GCryl™, and propylene glycol methyl ether acetate were first mixed in an Eiger Mill for 90 minutes and then the rest of the materials were added.

The black matrix thermal transfer coating was coated, at a thickness of about 0.94 μm, onto the interlayer of the Substrate/LTHC/Interlayer Element of Example 1 with a Yasui Seiki Lab Coater, Model CAG-150 (Yasui Seiki Co., Bloomington, Ind.). The optical density of the black matrix thermal transfer coating was about 3.2.

Examples 3–8

Formation of Black Matrix Layers

Six black matrix thermal transfer elements were made, according to Examples 1 and 2, but with different amounts of carbon in the black matrix transfer layer and different black matrix transfer layer thicknesses, as indicated in Table 3. For each example, the ratio of dispersant (i.e., Disperbyk™ 182) to carbon black was kept the same and the amount of the two resins were decreased proportionally as the amount of carbon black was increased. Each black matrix transfer layer had an optical density of about 3.2. In each case, a black matrix was imaged onto a glass receptor using a linear scan speed of 5.3 m/s. The result was a uniform transfer of the black matrix transfer layer as 100 micron wide lines with excellent edge uniformity and a flat top. Using a laser with a:smaller spot size lines that were 15 to 20 microns wide were also made. The volume resistivity of each of the layers is provided in Table 3, as measured by ASTM D257.

TABLE 3

Composition and Results with Black Matrix Transfer Elements

| Example | Carbon Black (wt. %) | Thickness ($\mu$m) | Resistivity (ohm-cm) |
|---|---|---|---|
| 3 | 45 | 0.94 | $1.1 \times 10^{13}$ |
| 4 | 46 | 0.92 | $5.1 \times 10^{11}$ |
| 5 | 47 | 0.90 | $4.0 \times 10^{10}$ |
| 6 | 48 | 0.88 | $6.9 \times 10^{9}$ |
| 7 | 49 | 0.86 | $1.1 \times 10^{9}$ |
| 8 | 50 | 0.85 | $1.4 \times 10^{8}$ |

The present invention should not be considered limited to the particular examples described above, but rather should be understood to cover all aspects of, the invention as fairly se out in the attached claims. Various modifications, equivalent processes, as well as numerous structures to which the present invention may be applicable will be readily apparent to those of skill in the art to which the present invention is directed upon review of the instant specification.

What is claimed is:

1. A method of forming a display device having a plurality of pixel elements, each pixel element comprising an electrically-conducting element to operate the pixel element, comprising:

forming a light-to-heat conversion layer over a donor substrate;

forming a black matrix transfer layer over the light-to-heat conversion layer;

contacting a substrate of the display device with the black matrix transfer layer;

selectively irradiating, according to a pattern, the light-to-heat conversion layer with light having at least one wavelength that the light-to-heat conversion layer can convert to heat energy;

thermally transferring, according to the pattern, a portion of the black matrix transfer layer to the substrate of the display device to form a black matrix defining a plurality of pixel elements, the black matrix having an optical density sufficient to provide optical contrast between adjacent pixel elements, a resistivity that substantially prevents cross-talk between the electrically-conducting elements of adjacent pixel elements, and a thickness to maintain substantial planarity with at least a portion of adjacent electrically-conducting elements;

forming, for each pixel element, an electrically-conducting element on the substrate of the display device, the black matrix separating adjacent electrically-conducting elements.

2. The method of claim 1, wherein forming a black matrix transfer layer comprises forming, over the light-to-heat conversion layer, a black matrix transfer layer comprising 40 to 50 wt. % carbon black.

3. The method of claim 1, wherein forming a black matrix transfer layer comprises forming, over the light-to-heat conversion layer, a black matrix transfer layer having an optical density of at least 2.4 for white light.

4. The method of claim 1, wherein thermally transferring a portion of the black matrix transfer layer comprises thermally transferring, according to the pattern, a portion of the black matrix transfer layer to the substrate of the display device to form a black matrix having a resistivity of at least $1 \times 10^{10}$ ohm-cm.

5. The method of claim 1, wherein forming a plurality of electrically-conducting elements comprises forming a plurality of electrically-conducting elements on the optical display substrate after thermally transferring a portion of the black matrix transfer layer to the optical display substrate.

* * * * *

UNITED STATES PATENT AND TRADEMARK OFFICE
CERTIFICATE OF CORRECTION

PATENT NO. : 6,783,915 B2
DATED : August 31, 2004
INVENTOR(S) : Pokorny, Richard J.

It is certified that error appears in the above-identified patent and that said Letters Patent is hereby corrected as shown below:

Column 1,
Lines 1 and 2, delete "Division of application No. 10/219,422, filed on Aug. 15, 2002, now Pat. No. 6,617,093, which is a division" and insert -- Division --, therefor.
Lines 4 and 6, after "application is a" delete "division of U.S. application Ser. No. 10/219,422, filed Aug. 15, 2002, U.S. Pat. No. 6,617,093, which is a".

Column 2,
Line 4, delete "Balck" and insert -- Black --, therefor.
Line 28, delete "black-matrix" and insert -- black matrix --, therefor.

Column 3,
Line 14, delete ";" and insert -- , --, therefor.
Line 26, after "well as" delete ",".

Column 4,
Line 12, delete "it" and insert -- to --, therefor.
Line 61, after "layer" insert -- 710', --.
Line 66, delete "maybe" and insert -- may be --, therefor.

Column 5,
Line 42, after "stability" delete ",".

Column 6,
Line 23, after "1.8)" insert -- . --.
Line 38, delete "radiation polarizing" and insert -- radiation-polarizing --, therefor.
Line 41, delete "includes" and insert -- include --, therefor.
Line 61, delete "ad" and insert -- a --, therefor.

Column 7,
Line 8, after "Soc." insert -- , --.
Line 14, after "and/or" delete ",".
Line 42, after "preferably" delete ".,".
Line 42, delete "20wt.%" and insert -- 20 wt. % --, therefor.
Line 43, delete "from.5" and insert -- from 5 --, therefor.
Line 43, delete "15%" and insert -- 15 wt.% --, therefor.
Line 59, delete "the," and insert -- the --, therefor.

UNITED STATES PATENT AND TRADEMARK OFFICE
CERTIFICATE OF CORRECTION

PATENT NO. : 6,783,915 B2
DATED : August 31, 2004
INVENTOR(S) : Pokorny, Richard J.

It is certified that error appears in the above-identified patent and that said Letters Patent is hereby corrected as shown below:

Column 8,
Line 44, after "titania" insert -- , --.
Line 51, delete "polymethacrylates,polyesters" and insert -- polymethacrylates, polyesters --, therefor.

Column 9,
Line 9, after "jet" delete ",".

Line 33, after "3" delete " ̈m, " and insert -- $\mu$m --, therefor.

Line 44, after "are" delete ",".

Column 10,
Line 62, delete "Disperbyk 182,Disperbyk" and insert -- Disperbyk™ 182, Disperbyk™ --, therefor.
Lines 62 and 63, delete "Disperbyk 160, Disperbyk 164" and insert -- Disperbyk™ 160, Disperbyk™ 164 --, therefor.

Column 11,
Lines 8-21, delete "In addition carbon ………. Tuscola, Ill.)." and insert the same on line 7.
Line 8, after "addition" insert -- , --.
Line 11, after "35" delete "m" and insert -- nm --, therefor.
Line 28, delete "th" and insert -- the --, therefor.
Line 48, delete "polyvinyl,resins" and insert -- polyvinyl resins --, therefor.

Column 12,
Line 31, after "matrix" delete ";".
Line 47, after "layers" delete "f" and insert -- of --, therefor.
Line 51, after "the" delete ",".

Column 13,
Line 16, delete "patter" and insert -- pattern --, therefor.
Line 53, delete "within±3" and insert -- within± 3 --, therefor.

UNITED STATES PATENT AND TRADEMARK OFFICE
CERTIFICATE OF CORRECTION

PATENT NO. : 6,783,915 B2
DATED : August 31, 2004
INVENTOR(S) : Pokorny, Richard J.

It is certified that error appears in the above-identified patent and that said Letters Patent is hereby corrected as shown below:

Column 15,
Line 20, delete "a:smaller" and insert -- a smaller --, therefor.
Line 39, after "of" delete ",".
Line 40, delete "se" and insert -- set --, therefor.

Signed and Sealed this

Eighteenth Day of January, 2005

JON W. DUDAS
*Director of the United States Patent and Trademark Office*